No. 792,508. PATENTED JUNE 13, 1905.
J. V. DUNN.
CART.
APPLICATION FILED SEPT. 3, 1904.

Witnesses

Inventor
J. V. Dunn,
By Victor J. Evans
Attorney

No. 792,508. Patented June 13, 1905.

UNITED STATES PATENT OFFICE.

JOHN V. DUNN, OF PROVO CITY, UTAH.

CART.

SPECIFICATION forming part of Letters Patent No. 792,508, dated June 13, 1905.

Application filed September 3, 1904. Serial No. 223,228.

*To all whom it may concern:*

Be it known that I, JOHN V. DUNN, a citizen of the United States, residing at Provo City, in the county of Utah and State of Utah, have invented new and useful Improvements in Carts, of which the following is a specification.

This invention relates to carts designed especially for attachment to bicycles for purposes of hauling various materials, and has for its objects to produce a simple device of this character which will be light, strong, and durable and may be readily attached to the bicycle and one wherein the contents of the cart will be protected from contact with the wheels of the latter.

To these ends the invention comprises the novel features of construction and combination of parts more fully hereinafter described.

Figure 1:
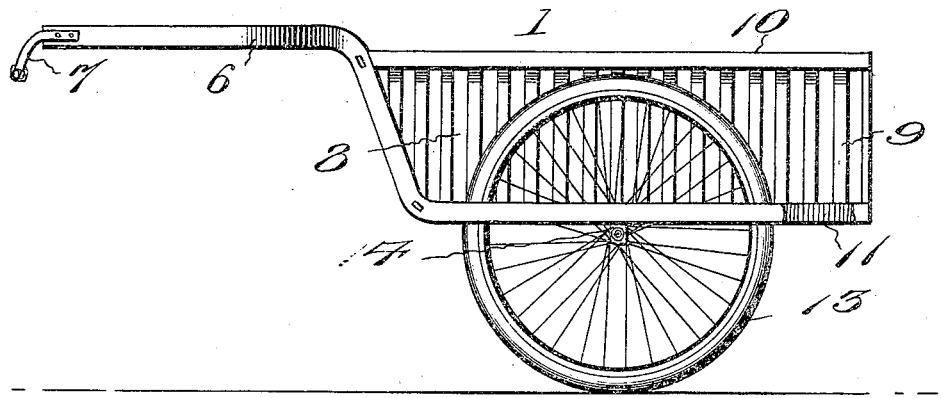
Figure 2:
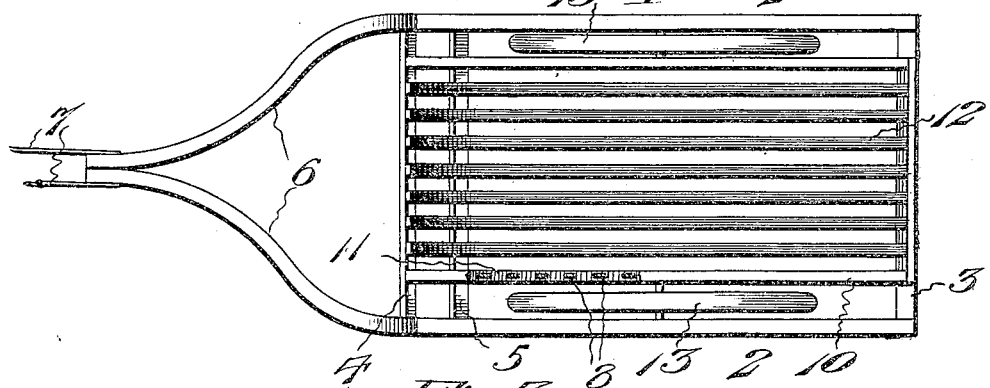
Figure 3:
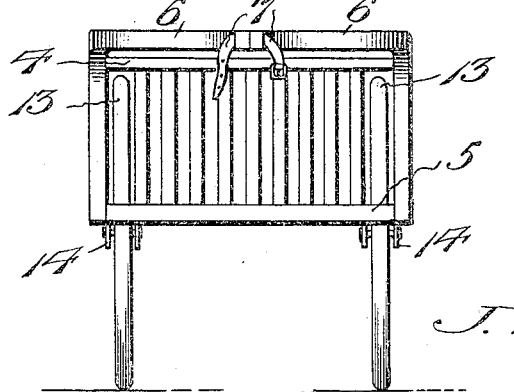

In the accompanying drawings, Figure 1 is a side elevation of the cart embodying the invention. Fig. 2 is a top plan view of the same. Fig. 3 is a front end elevation.

Referring to the drawings, 1 designates the framework of the cart, which as a whole comprises a pair of side bars or rails 2, arranged in spaced parallel relation and connected at their rear ends by a transverse bar 3 and at their forward ends by upper and lower transverse bars 4 and 5, respectively, said side rails being bent upwardly and inwardly between their ends to produce a pair of forwardly-converging shafts 6, which meet at their forward outer ends, as shown, and have attached to their meeting ends straps or other flexible elements 7, by which the cart may be attached to the seat-post of a bicycle.

The cart body or receptacle comprises a pair of side panels 8, composed of vertical slats 9, attached at their upper and lower ends to top and bottom horizontal rails 10 and 11, respectively, and a series of parallel bottom slats 12, attached at their rear ends to the rear transverse bar 3 and between their ends to the lower connecting-bar 5, from which point they are bent upwardly and have their forward upper terminals attached to the upper transverse bar 4, thus being rendered continuous in the formation of the bottom and front end wall of the cart-body.

The longitudinal rails 2 and 11 are appropriately spaced apart, as illustrated in Fig. 2, to receive between them the transporting-wheels 13, which are journaled for rotation in bearing-brackets 14, attached to and depending respectively from said rails. It will be observed that under this construction the wheels will lie upon the outer side faces of the panels 8 and will thus be prevented from contact with the contents of the cart, while at the same time the rails 2 will serve as guards to protect the wheels from contact with exterior objects during transportation of the device.

It is apparent from the foregoing that I produce a simple, light, and inexpensive cart which may be readily attached to a bicycle or other velocipede for use in hauling and one which in practice will efficiently perform its functions. In attaining these ends it is to be understood that minor changes in the details herein set forth may be resorted to without departing from the spirit of the invention.

Having thus described the invention, what is claimed as new is—

1. In a device of the class described, a frame including outer side bars and transverse connecting-bars, said side bars being continued forwardly to produce shafts, a receptacle carried by the frame and including side panels spaced from the side bars, and transporting-wheels arranged in the spaces between the side bars and panels, the latter serving as shields to prevent contact of the wheels with the contents of the receptacle.

2. In a device of the class described, a frame comprising outer side bars bent upwardly and forwardly between their ends, a rear transverse bar and upper and lower transverse bars connecting the side bars, a receptacle comprising side panels spaced from the outer side bars and bottom slats attached to the rear and upper and lower transverse bars to thus form a continuous bottom and front wall, and transporting-wheels arranged in the spaces between the outer side bars and side panels.

In testimony whereof I affix my signature in presence of two witnesses.

JOHN V. DUNN.

Witnesses:
E. R. SMYTH,
JOHN E. JONES.